ง

United States Patent [19]
Sellers

[11] Patent Number: 5,966,285
[45] Date of Patent: *Oct. 12, 1999

[54] MOBILE PORTABLE COMPUTER DOCKING/OFFICE STATION

[75] Inventor: Charles Sellers, Houston, Tex.

[73] Assignee: Compaq Computer Corporation, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/869,529

[22] Filed: Jun. 6, 1997

[51] Int. Cl.⁶ .............................. G06F 1/16; B60R 11/02; H05K 5/00
[52] U.S. Cl. ........................... 361/686; 108/44; 224/275; 224/929
[58] Field of Search ...................................... 361/680, 681, 361/683, 686; 248/183, 503, 503.1, 183.1–183.4; 108/44; 297/188.01, 188.2; 364/708.1; 224/275, 929

[56] References Cited

U.S. PATENT DOCUMENTS

| | | | |
|---|---|---|---|
| 4,758,020 | 7/1988 | Boyd ........................................ | 280/801 |
| 4,946,120 | 8/1990 | Hatcher ................................... | 248/183 |
| 5,488,572 | 1/1996 | Belmont ................................. | 361/686 |
| 5,535,093 | 7/1996 | Noguchi et al. ........................ | 361/686 |
| 5,555,491 | 9/1996 | Tao .......................................... | 361/686 |
| 5,604,663 | 2/1997 | Shin et al. .............................. | 361/686 |
| 5,633,782 | 5/1997 | Goodman et al. ...................... | 361/683 |
| 5,664,118 | 9/1997 | Nishigaki et al. ...................... | 395/283 |
| 5,666,265 | 9/1997 | Lutz et al. .............................. | 361/683 |
| 5,667,272 | 9/1997 | Sutton ..................................... | 297/140 |

*Primary Examiner*—Lynn D. Feild
*Attorney, Agent, or Firm*—Konneker & Smith, P.C.

[57] ABSTRACT

A mobile portable computer docking/office station is adapted for use in an automotive vehicle or a hotel room and includes a portable housing which may be rested on a car or truck seat. The housing is shaped to resemble a child's car seat, and has exterior side surface indentations which receive portions of the vehicle's passenger side seat belt structure to hold the housing in place on the vehicle seat. A docking area is formed in the housing and is provided with an electrical connector that mates with a corresponding connector on a portable computer when the computer is operatively inserted into the docking area. A printer/scanner unit, a cellular modem, a pair of speakers, and a computer battery charger are carried by the housing and are operatively coupled to the docking area connector. DC electrical power may be transmitted to these components by a self-retracting power cord carried by the housing and having an outer end member that may be plugged into the vehicle's cigarette lighter. A cellular phone is also included with the docking/office station and is removably supportable in a cradle recess formed in the housing portion of the portable docking/office station.

30 Claims, 1 Drawing Sheet

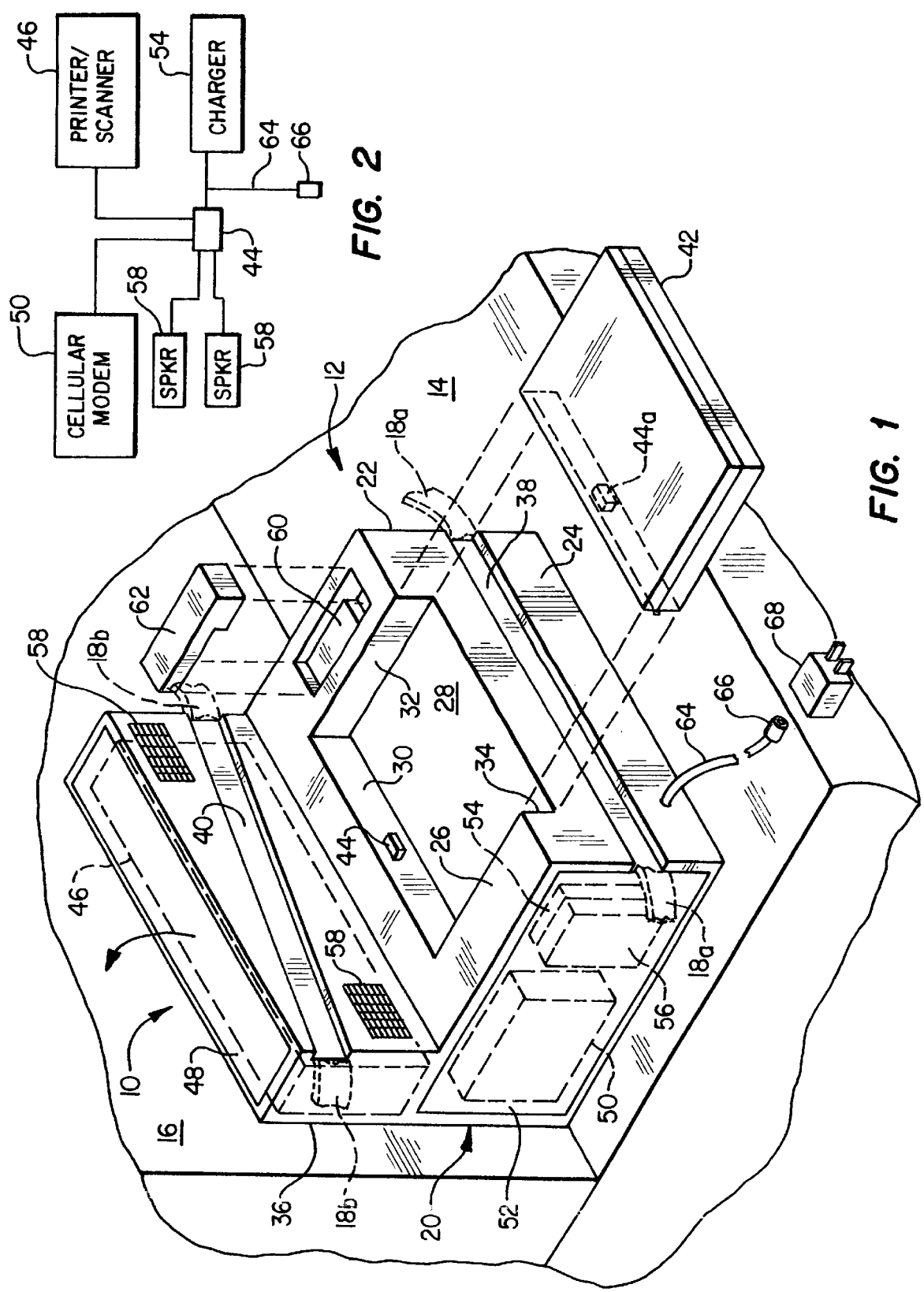

MOBILE PORTABLE COMPUTER DOCKING/OFFICE STATION

BACKGROUND OF THE INVENTION

1. Field of the Invention

The present invention generally relates to computer apparatus and, in a preferred embodiment thereof, more particularly provides a mobile portable computer docking/office station for use in an automotive vehicle and/or a hotel room.

2. Description of Related Art

When returning to their office or home from a business trip, many portable computer users connect the portable computer which they used on the trip to the docking station portion of their office or home computer work station to connect the portable computer is to the various components of their home or off ice computer work station such as a printer, desktop monitor and the like. As is well known, the user's home or office computer work station is typically more comfortable to use then his portable computer by itself, and provides him with the ability to easily perform many more business work tasks than the stand-alone portable computer.

However, the various docking and peripheral components which are likely to be individually incorporated in the typically stationary home or business computer work station are simply not well suited to be carted off on the usual business trip with the relatively diminutive portable computer, and are equally ill suited for use "on the road" in a car or hotel room. Accordingly, in the past the business traveler/computer user has traditionally been constrained, until he returned from the trip, to the limited work functions that could be incorporated by the manufacturer into his portable computer.

In view of this it would be highly desirable to provide the business traveler with a portable computer system which more closely approximated the computing and other work capabilities of the typical home or office computer work station.

SUMMARY OF THE INVENTION

In carrying out principles of the present invention, in accordance with a preferred embodiment thereof, a mobile portable computer docking/office station is provided that is suitable for use in a hotel room or in an automotive vehicle such as a car or truck, and conveniently permits a portable computer user to carry both his computer and various other associated data transfer devices and related office equipment with him on a business trip.

The docking/work station includes a housing which may be rested atop an automotive vehicle seat and is preferably configured to resemble a child's car seat. The housing is configured to facilitate its seat belt attachment to the vehicle seat to prevent the station from falling off or shifting around on the seat. This configuration is preferably achieved by providing the housing with means for complementarily receiving a portion of a seat belt looped around the housing and defining an abutment operative to restrain the received seat belt portion against vertical movement relative to the housing (i.e., in a direction generally transverse to the length of the received seat belt portion). Illustratively, these means include a side surface recess formed in the housing, but could alternatively be a variety of equivalent seat belt receiving and restraining structures formed on or otherwise secured to the housing.

A docking area is formed in the housing and adapted to receive a portable computer, with a first electrical connector being mounted in the docking area and positioned to be releasably mated with a corresponding electrical connector on the computer when the computer is operatively moved into the docking area.

The housing thus serves as a docking station for the portable computer. Additionally, the housing carries data transfer apparatus useable in conjunction with the computer and operative to input and output data in both hard copy and electronic forms. Preferably, the data transfer apparatus includes a printer/scanner unit carried in the housing and may further include a cellular modem carried in the housing.

In a preferred embodiment of the docking/office station, the housing also carries speakers for use in conjunction with, for example, the CD ROM portion of the computer, a charger adapted to support and electrically recharge a spare battery for the computer, and a support cradle for supporting a cellular phone. Representatively, the printer/scanner, the cellular modem, the charger and the speakers are electrically coupled to the housing docking connector.

Electrical power may be transmitted to the charger and, via the docking station connector, to the printer/scanner, cellular modem and speakers by means of a self-retractable DC power cord carried by the housing and having an outer end portion insertable into the cigarette lighter of the vehicle. An AC-to-DC convertor is preferably provided for use when AC electrical power is available.

While the computer user is traveling, the entire station is simply secured to the passenger's seat by the existing seat belt structure. When the user arrives at a meeting site he simply removes the docked computer from the housing which remains on the vehicle seat while he attends the meeting. The remaining housing's resemblance to a simple child's car seat, together with the seat belt structure looped around it, functions as a theft deterrent by, in effect, camouflaging the housing.

The station may be used in the vehicle, while it is parked, by simply loosening the seat belt structure and turning the housing on the vehicle seat until the docked computer faces the driver. When the in-vehicle use of the station is completed the housing is rotated back to its forwardly facing orientation, the seat belt structure retightened, and the vehicle driven off.

After the user reaches the hotel, the entire docking/work station may be easily carried to the room where it functions as an away-from-home computer work station which provides the user with many useful work station capabilities which were unavailable with only the portable computer.

BRIEF DESCRIPTION OF THE DRAWINGS

FIG. 1 is a simplified, partially exploded perspective view of a mobile portable computer docking/office station embodying principles of the present invention and resting atop a representative automotive vehicle passenger seat; and FIG. 2 is a schematic wiring diagram illustrating the electrical interconnection of various components of the docking/office station.

DETAILED DESCRIPTION

Perspectively illustrated in FIG. 1 in simplified, partially exploded form is a specially designed mobile portable computer docking/office station 10 which embodies principles of the present invention. The compact size and configuration of the station 10 renders it uniquely suitable for use in a hotel room or in an automotive vehicle (such as a car or truck) having a seat 12 with a bottom portion 14, a backrest portion 16, and a seat belt 18 having a shoulder portion 18a and a lap portion 18b.

The portable docking/office station 10 includes a housing portion 20 which, as can be seen in FIG. 1, is shaped to resemble a child's car seat. Housing 20 has a generally rectangular base portion 22 with a front side 24 and a top side 26. An inset rectangular docking area 28 extends downwardly through the top side 26 and has a vertical rear or inner side wall 30. It can be seen that the docking area 28 is positioned between left and right upper portions 32 and 34 of the base 22 which respectively resemble left and right car seat arm rests. At the rear side of the housing 20 is an upwardly projecting portion 36 which resembles the backrest portion of a child's car seat.

As shown in FIG. 1, the housing 20 is configured to rest atop the bottom portion 14 of the automotive vehicle seat 12, with the back of the housing positioned against the seat backrest portion 16. To facilitate the securement of the housing to the seat 12 during motion of the vehicle generally horizontal indentations 38 and 40 are respectively formed on the front sides of the housing base portion 22 and its upwardly projecting rear portion 36. As illustrated in phantom in FIG. 1, the seat belt lap portion 18a is looped around the housing base portion 22 and received in its indentation 38, and the seat belt shoulder portion 18b is looped around the upwardly projecting rear housing portion 36 and received in its indentation 40.

Portable docking/office station 10 also includes a portable computer, representatively a notebook computer 42, which in its illustrated closed orientation is rearwardly insertable into the docking area 28 to operatively couple the docked computer to various other subsequently described work station components disposed within the housing 20. An electrical connector 44 mounted on the rear docking area wall 30 is positioned to be releasably mated with a corresponding electrical connector 44a on the rear side of the computer 42 when the computer is operatively received (i.e., "docked") within the docking area 28.

The computer work station components built into the housing 20 for convenient transport therewith include data transfer means for inputting and outputting data in both hard copy and electronic format. Representatively, such data transfer means include a printer/scanner unit 46 disposed within the rear housing portion 36 and accessible via a flip-open lid portion 48 on the top of the housing portion 36. The unit 46 is operable to scan in documents and transfer the scanned information to the docked computer 42, or to receive electronic information from the docked computer and output hard copy versions of the electronic information. The data transfer means also representatively include a cellular modem 50 carried within a right side portion of the housing 20 behind a suitable access panel 52.

Also disposed within the housing 20, behind the right side access panel 52 is a charger structure 54 operative to hold and charge a spare computer battery 56. Other work station components representatively carried by the housing 20 include a pair of speakers 58 mounted on the front side of the upwardly projecting rear housing portion 36 and useable to generate sound created by, for example, the CD ROM portion of the docked computer 42. Finally, a cellular phone cradle 60 is built into a left top side portion of the housing base 22 and is configured to supportingly receive a cellular phone 62.

A self-retractable DC electrical power cord 64 is suitably carried by the housing 20 and has a power-receiving outer end portion 66 which may be removably plugged into the cigarette lighter of the car or truck in which the docking/work station 10 is placed. As schematically indicated in FIG. 2, the DC power cord 64 is coupled to the charger 54 and, via the docking connector 44, to the printer/scanner 46, the cellular modem 50, and the speakers 58. A suitable AC-to-DC converter 68 is also provided for use in, for example, a hotel room. To use the converter, the DC cord end portion 66 is plugged into a rear side of the converter 68 and the converter is plugged into a nearby 110 volt AC outlet.

It can be seen that the docking/office station 10 provides the mobile computer user with a compact, easily portable array of home/office computer work station components which are suitable for use in either an automotive vehicle or a hotel room. For in-vehicle use, the seat belt portions 18a and 18b may simply be loosened and the housing 20 rotated ninety degrees on the vehicle seat portion 14 toward the driver when the vehicle is parked. This positions the docked computer 42 and the cellular phone 62 within easy reach of the driver. When the in-vehicle use of the docking/work station 10 is completed, the driver simply pivots the housing 20 back to its forwardly facing position, retightens the seat belt portions 18a and 18b and drives away.

When the computer user arrives at a business meeting he may simply undock the computer 42 and take it with him to the meeting, leaving the balance of the station 10 in place on the vehicle seat portion 14 with the seat belt portions 18a,18b left tightened around the housing 20. The resemblance of the housing to a child's car seat, and the fact that it is secured to the seat with seat belts, provides (by, in effect, camouflaging the housing) an appreciable measure of theft deterrence since a car seat is typically not an in-car structure particularly sought after by thieves.

After the meeting, the user can simply redock the computer 42 and drive to his hotel. Upon arriving at the hotel the user can then undo the seat belt portions 18a,18b and easily carry the entire docking/office station 10 to his room. The station can then be used in the hotel room to perform a variety of computer and office work functions that simply could not be accomplished with the portable computer 42 alone.

The foregoing detailed description is to be clearly understood as being given by way of illustration and example only, the spirit and scope of the present invention being limited solely by the appended claims.

What is claimed is:

1. Mobile portable computer docking/office station apparatus comprising:

a portable housing having a docking area for removably receiving a portable computer inserted thereinto;

a first electrical connector carried in said docking area and being removably mateable with a second electrical connector on the portable computer in response to insertion of the portable computer into said docking area;

data transfer apparatus, carried by said portable housing for inputting and outputting data in both hard copy and electronic formats;

coupling apparatus, carried by said portable housing for electrically interconnecting said data transfer apparatus to the portable computer when it is operatively received in said docking area; and a seat belt attachment structure carried by said portable housing and having an indented portion configured to complementarily receive a longitudinal portion of a seat belt looped around said portable housing, said indented portion having facing abutment surfaces positioned and configured to be closely adjacent opposite portions of the received longitudinal seat belt portion and restrain movement of the received longitudinal seat belt portion relative to said portable housing in opposite directions transverse to the length of the received longitudinal seat belt portion.

2. The apparatus of claim 1 further comprising a portable computer operatively receivable in said docking area and having a second electrical connector releasably mateable with said first electrical connector.

3. The apparatus of claim 1 wherein said data transfer apparatus includes a printer/scanner structure.

4. The apparatus of claim 3 wherein said printer/scanner structure is carried within said portable housing.

5. The apparatus of claim 1 wherein said data transfer apparatus includes a cellular modem.

6. The apparatus of claim 5 wherein said cellular modem is carried within said portable housing.

7. The apparatus of claim 1 further comprising a battery charger carried by said portable housing and being operative to receive and charge a computer battery.

8. The apparatus of claim 7 wherein said battery charger is carried within said portable housing.

9. The apparatus of claim 1 further comprising:
   at least one speaker carried by said portable housing; and
   means for electrically coupling said at least one speaker to the portable computer when it is operatively received in said docking area.

10. The apparatus of claim 1 further comprising a cellular telephone cradle structure disposed on said portable housing.

11. The apparatus of claim 10 further comprising a cellular telephone removably receivable by said cradle structure.

12. The apparatus of claim 1 further comprising power receiving apparatus, carried by said portable housing, for receiving electrical power from a source thereof and transferring the received electrical power to said coupling apparatus.

13. The apparatus of claim 12 wherein said power receiving means include a self-retractable power cable having a power-receiving outer end portion removably insertable into an automotive vehicle cigarette lighter.

14. The apparatus of claim 1 wherein said portable housing is sized to rest atop an automotive vehicle seat.

15. The apparatus of claim 14 wherein said portable housing has a shape similar to that of a child's car seat.

16. Mobile portable computer docking/office station apparatus comprising:
   a portable housing having a docking area for removably receiving a portable computer inserted thereinto;
   a first electrical connector carried in said docking area and being removably mateable with a second electrical connector on the portable computer in response to insertion of the portable computer into said docking area;
   data transfer apparatus, carried by said portable housing, for inputting and outputting data in both hard copy and electronic formats; and
   coupling apparatus, carried by said portable housing, for electrically interconnecting said data transfer apparatus to the portable computer when it is operatively received in said docking area;
   said portable housing being sized to rest atop an automotive vehicle seat and configured to facilitate the seat belt securement thereof on the automotive seat, said portable housing having at least one outer side surface depression configured to receive a portion of a seat belt looped around said portable housing.

17. Computer apparatus comprising:
   a portable housing adapted to rest atop an automotive vehicle seat and being shaped to resemble a child's car seat, said portable housing having a docking area for removably receiving a portable computer;
   a first electrical connector carried in said docking area and being removably mateable with a second electrical connector on the portable computer in response to insertion of the portable computer into said docking area; and
   a seat belt attachment structure carried by said portable housing and having an indented portion configured to complementarily receive a longitudinal portion of a seat belt looped around said portable housing, said indented portion having facing abutment surfaces positioned and configured to be closely adjacent opposite portions of the received longitudinal seat belt portion and restrain movement of the received longitudinal seat belt portion relative to said portable housing in opposite directions transverse to the length of the received longitudinal seat belt portion.

18. The computer apparatus of claim 17 further comprising a portable computer operatively receivable in said docking area and having a second electrical connector releasably mateable with said first electrical connector.

19. Computer apparatus comprising:
   a portable housing adapted to rest atop an automotive vehicle seat and being shaped to resemble a child's car seat, said portable housing having a docking area for removably receiving a sortable computer; and
   a first electrical connector carried in said docking area and being removably mateable with a second electrical connector on the portable computer in response to insertion of the portable computer into said docking area,
   said portable housing being configured to facilitate the seat belt securement of said portable housing to an automotive vehicle seat, said portable housing having at least one outer side surface depression formed in said portable housing and configured to receive a portion of a seat belt looped around said portable housing.

20. Portable computer docking/workstation apparatus comprising a portable housing adapted to rest atop an automotive vehicle seat having a generally horizontally extending bottom portion and a generally vertically extending backrest portion, said portable housing having:
   a base portion with a front side, a back side adapted to be positioned against the vehicle seat backrest portion, a top side, a bottom side adapted to be rested on the vehicle seat bottom portion, and left and right vertical sides extending between said top and bottom sides;
   a top rear end portion extending upwardly from a rear part of said top side of said base portion;
   a recess formed in said top side of said base portion, said recess being positioned forwardly of said top rear end portion, spaced horizontally inwardly from said left and right vertical sides, and defining in said base portion a docking area for removably receiving a portable computer inserted thereinto;
   a first electrical connector carried in said docking area and being removably mateable with a second electrical connector on the portable computer in response to insertion of the portable computer into said docking area; and a securement structure for facilitating the seat belt securement of said portable housing to the vehicle seat, said securement structure including a seat belt attachment structure carried by said portable housing and having an indented portion configured to complementarily receive a longitudinal portion of a seat belt looped around said portable housing, said indented portion having facing abutment surfaces positioned and configured to be closely adjacent opposite portions of the received longitudinal seat belt portion and restrain movement of the received longitudinal seat belt portion relative to said portable housing in opposite directions transverse to the length of the received longitudinal seat belt portion.

21. The portable computer docking/workstation apparatus of claim 20 further comprising a portable computer operatively receivable in said docking area and having a second electrical connector releasably mateable with said first electrical connector.

22. The portable computer docking/workstation apparatus of claim 20 further comprising:

data transfer apparatus carried by said portable housing and operative to input and output data in both hard copy and electronic formats, and coupling apparatus carried by said portable housing and operative to electrically interconnect said data transfer apparatus to the portable computer when it is operatively received in said docking area.

23. The portable computer docking/workstation apparatus of claim 22 further comprising power receiving apparatus, carried by said portable housing, for receiving electrical power from a source thereof and transferring the received electrical power to said coupling apparatus.

24. The portable computer docking/workstation apparatus of claim 20 further comprising a battery charger carried by said portable housing and being operative to receive and charge a computer battery.

25. The portable computer docking/workstation apparatus of claim 20 further comprising:

at least one speaker carried by said portable housing, and means for electrically coupling said at least one speaker to the portable computer when it is operatively received in said docking area.

26. Portable computer docking/workstation apparatus comprising a portable housing adapted to rest atop an automotive vehicle seat having a generally horizontally extending bottom portion and a generally vertically extending backrest portion, said portable housing having:

a base portion with a front side, a back side adapted to be positioned against the vehicle seat backrest portion, a top side, a bottom side adapted to be rested on the vehicle seat bottom portion, and left and right vertical sides extending between said too and bottom sides;

a top rear end portion extending upwardly from a rear part of said top side of said base portion;

a recess formed in said top side of said base portion, said recess being positioned forwardly of said top rear end portion, spaced horizontally inwardly from said left and right vertical sides, and defining in said base portion a docking area for removably receiving a portable computer inserted thereinto;

a first electrical connector carried in said docking area and being removably mateable with a second electrical connector on the portable computer in response to insertion of the portable computer into said docking area; and a securement structure for facilitating the seat belt securement structure of said portable housing to the vehicle seat, said securement structure including at least one outer side surface indentation formed in said portable housing and configured to receive a portion of a seat belt looped around said portable housing.

27. The portable computer docking/workstation apparatus of claim 26 wherein said at least one outer side surface indentation includes:

a first indentation formed in the front side of said top rear end portion of said portable housing and configured to receive a section of a shoulder portion of a seat belt, and a second indentation formed in the front side of said base portion of said portable housing and configured to receive a section of a lap portion of a seat belt.

28. Mobile portable computer docking/office station apparatus comprising:

a portable housing having a docking area for removably receiving a portable computer inserted thereinto;

a first electrical connector carried in said docking area and being removably mateable with a second electrical connector on the portable computer in response to insertion of the portable computer into said docking area;

data transfer apparatus, carried by said portable housing for inputting and outputting data in both hard copy and electronic formats;

coupling apparatus, carried by said portable housing for electrically interconnecting said data transfer apparatus to the portable computer when it is operatively received in said docking area; and means, associated with said portable housing, for defining an indented area configured to complementarily receive a longitudinal portion of a seat belt looped around said portable housing, said indented area having facing abutment surfaces positioned and configured to be closely adjacent opposite portions of the received longitudinal seat belt portion and being operative to restrain the received longitudinal seat belt portion against movement relative to said portable housing in opposite directions generally transverse to the length of the received longitudinal seat belt portion.

29. Computer apparatus comprising:

a portable housing adapted to rest atop an automotive vehicle seat and being shaped to resemble a child's car seat, said portable housing having a docking area for removably receiving a portable computer;

a first electrical connector carried in said docking area and being removably mateable with a second electrical connector on the portable computer in response to insertion of the portable computer into said docking area; and means, associated with said portable housing, for defining an indented area configured to complementarily receive a longitudinal portion of a seat belt looped around said portable housing, said indented area having facing abutment surfaces positioned and configured to be closely adjacent opposite portions of the received longitudinal seat belt portion and being operative to restrain the received longitudinal seat belt portion against movement relative to said portable housing in opposite directions generally transverse to the length of the received longitudinal seat belt portion.

30. Portable computer docking/workstation apparatus comprising a portable housing adapted to rest atop an automotive vehicle seat having a generally horizontally extending bottom portion and a generally vertically extending backrest portion, said portable housing having:

- a base portion with a front side, a back side adapted to be positioned against the vehicle seat backrest portion, a top side, a bottom side adapted to be rested on the vehicle seat bottom portion, and left and right vertical sides extending between said top and bottom sides;
- a top rear end portion extending upwardly from a rear part of said top side of said base portion;
- a recess formed in said top side of said base portion, said recess being positioned forwardly of said top rear end portion, spaced horizontally inwardly from said left and right vertical sides, and defining in said base portion a docking area for removably receiving a portable computer inserted thereinto;
- a first electrical connector carried in said docking area and being removably mateable with a second electrical connector on the portable computer in response to insertion of the portable computer into said docking area; and
- means, associated with said portable housing, for defining an indented area configured to complementarily receive a longitudinal portion of a seat belt looped around said portable housing, said indented area having facing abutment surfaces positioned and configured to be closely adjacent opposite portions of the received longitudinal seat belt portion and being operative to restrain the received longitudinal seat belt portion against movement relative to said portable housing in opposite directions generally transverse to the length of the received longitudinal seat belt portion.

\* \* \* \* \*